Figure 1:
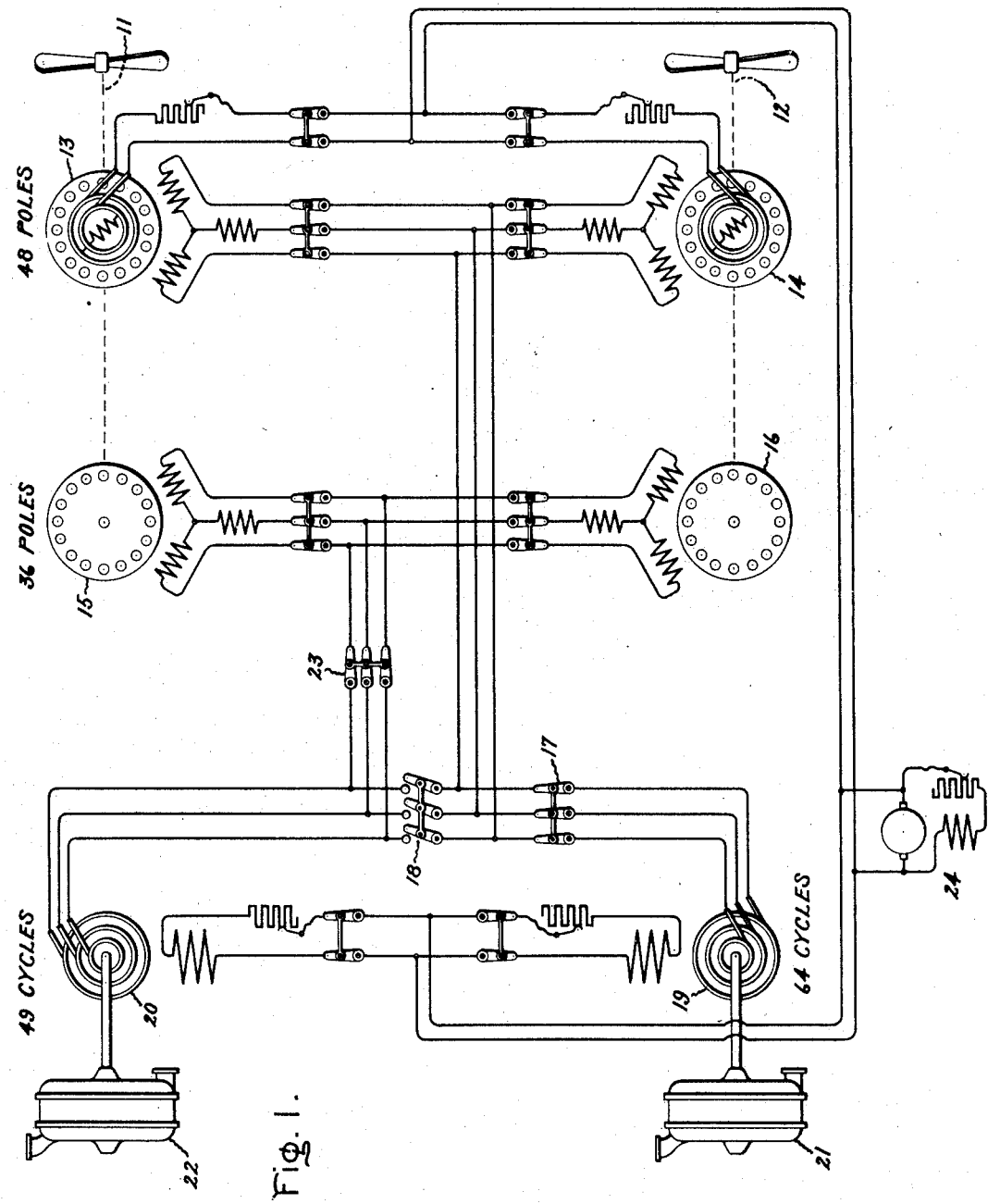

UNITED STATES PATENT OFFICE.

JOHN MARTIN AND FREDERICK H. CLOUGH, OF RUGBY, ENGLAND, ASSIGNORS TO GENERAL ELECTRIC COMPANY, A CORPORATION OF NEW YORK.

ELECTRIC SHIP PROPULSION.

1,417,342.      Specification of Letters Patent.      Patented May 23, 1922.

Application filed March 24, 1921. Serial No. 455,187.

*To all whom it may concern:*

Be it known that we, JOHN MARTIN and FREDERICK HORTON CLOUGH, subjects of the King of Great Britain, residing at Rugby, in the county of Warwickshire, England, have invented certain new and useful Improvements in Electric Ship Propulsion, of which the following is a specification.

Our invention relates to electric ship propulsion, and more particularly to an electric ship propulsion system in which there are a plurality of prime movers driving alternators at different speeds whereby a plurality of alternating current sources of different frequencies are obtained for the operation of driving motors located on the propeller shafts.

Our system of ship propulsion is particularly adapted to such service as the propulsion of battle ship cruisers, where it is generally desirable to drive the ship at a cruising speed but where at times it should be possible to drive it at high speed, irrespective of economy. It has been proposed in the past to obtain this object by providing one or more sets per ship consisting of two turbine driven alternators each, the alternators in each set being designed to supply different frequencies and the power from these alternators being applied to drive synchronous motors mounted on the propeller shafts. In one proposed arrangement, there are two motors mounted on each saft with their pole numbers so arranged that when the motors are connected up to their respective alternators the synchronous speed of both motors will be the same. When the alternators are operating at full speed this method of operation gives the high power and high speed condition of the drive. For the low speed condition the high frequency alternator is inactive and the low frequency alternator is connected to those motors having the greater number of poles, so that the synchronous speed of these motors is reduced in proportion to the reduction in the frequency of the source. In this way but one alternator may be used to supply all the power necessary at low speed. Economical running is, however, still obtained because one alternator is running at its normal full speed and with approximately normal output.

In the arrangement described above, difficulties may be encountered when there is a change from low speed drive to high speed drive, where there are two or more propeller shafts. While the propeller shafts are being driven at low speed by the connection of the synchronous motors with the greater pole numbers to the low frequency source, it is not at all certain that the motors with the fewer poles are also in synchronism, so that in case power should be supplied to these motors of fewer poles in parallel, there is no assurance that circulating currents would not flow between them. The object of the present invention is to insure that these circulating currents do not flow when the motors having the fewer poles are connected to the low frequency source, or, in other words, that the motors of fewer poles are synchronized, whenever the other motors are synchronized.

Figure 2:
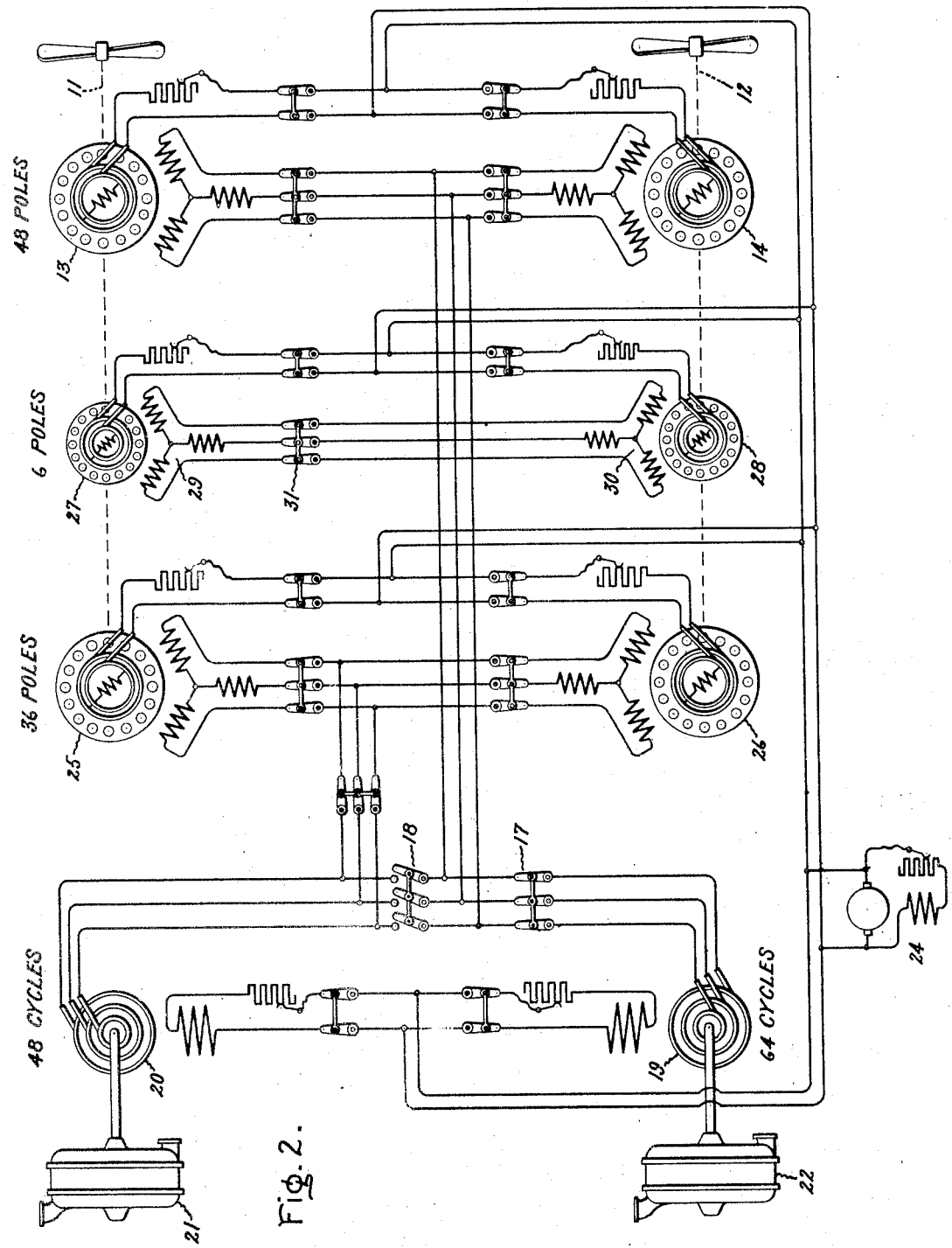

For a better understanding of our invention, reference is to be had to the following specification together with the accompanying drawing, in which Fig. 1 is one embodiment of our invention, while Fig. 2 shows a modification.

Referring now more in detail to the drawing, in Fig. 1 we show a pair of propeller shafts 11 and 12 upon each of which there is directly mounted a synchronous motor. These synchronous motors are designated by the numerals 13 and 14 and are each shown as having 48 poles, although this number is merely taken by way of example. Also mounted upon the propeller shafts 11 and 12 are another set of driving motors 15 and 16 of fewer poles, for example 36 poles. The synchronous motors 13 and 14 are adapted to be connected by means of switches 17 or 18 either to an alternator 19 of comparatively high frequency or to an alternator 20 of comparatively low frequency. These alternators are driven by prime movers, such as steam turbines 21 and 22. The motors 15 and 16 are adapted to be connected, as for example by means of switch 23, to the low frequency alternator 20. An exciter 24 driven from any appropriate source is provided to supply the excitation of the synchronous motors 13 and 14 as well as the alternators 19 and 20.

Matters are so arranged as between the two propeller shafts 11 and 12 that the rotors of the motors 15 and 16 are always in synchronism whenever the rotors of motors 13 and 14 are in synchronism. In the present instance we accomplish this result by making motors 15 and 16 squirrel cage induction motors. The squirrel cage rotors are preferably so constructed that there are a large number of bars per pole for each pole of the synchronous motors 13 and 14. In this way, so long as the rotors of the synchronous motors 13 and 14 are in synchronism, these induction motors may be supplied in parallel from a source and no appreciable circulating currents can flow between them. The high frequency source has 64 cycles and the low frequency source has 49 cycles, when the propeller shafts operate at normal high speed. The connections in Fig. 1 show the high speed condition for which purpose switches 17 and 23 are closed, and switch 18 is open. The induction motors 15 and 16 operate at about 2% slip while the synchronous motors 13 and 14 are operating at synchronism from the 64 cycle alternator 19. With these pole numbers the speeds of all the motors are at the correct amount and equal 160 revolutions per minute. The synchronous speed of the induction motors 15 and 16 would be about three revolutions higher than this.

For low speed operation the low speed alternator 20 is connected to the synchronous motors 13 and 14 and disconnected from the induction motors 15 and 16. The high frequency alternator 19 is likewise disconnected. This may be readily performed by appropriately manipulating switches 17, 18 and 23. Should the turbine 22 be operating at its normal full speed, then the alternator 20 would be operating to supply power at 49 cycles to the synchronous motors. The speed of the propeller shafts would then be about 122 revolutions per minute and the power required would be approximately 58% of that required at top speed. The alternator 20 can properly be designed to take care of this. Somewhat higher speeds may be obtained by varying the speeds of the alternators. All maneuvering, such as going in and out of ports, reversing, etc., would be done with the use of the synchronous motors 13 and 14 alone and connected to the low frequency source, and these motors would preferably be built with a high resistance squirrel cage winding on the periphery of the poles, so that they may be used as induction motors for certain stages of the operation of the system.

We have illustrated in Fig. 2 another means for preventing the flow of circulating currents between the motors having fewer poles when they are switched on the line in passing from low speed to high speed operation. In this embodiment the synchronous motors 13 and 14 are arranged as before and are adapted to be connected by means of switches 17 or 18 to either the high frequency alternator 19 or the low frequency alternator 20. In this instance the motors 25 and 26 having 36 poles may be of the synchronous type. The low frequency source in this instance must have 48 cycles in order that the speed of these motors 25 and 26 may be equal to the synchronous speed of the motors 13 and 14. Located between these two motors and directly mounted on the shafts 11 and 12 are means for keeping the motors 25 and 26 in synchronism while the motors 13 and 14 are in synchronism. These means comprise dynamo electric machines 27 and 28 mounted on the shafts 11 and 12 and having stators 29 and 30 connected by a switch 31 so that their E. M. F.'s are opposed. The rotor members of these dynamo electric machines are provided with direct current excitation and are built like the revolving fields of synchronous motors, while the stator members 29 and 30 are built like the stationary armatures. These dynamo electric machines 27 and 28 have such a number of poles that there is an even number of poles on the motors 13, 14, 25 and 26 for each of the poles of this field member. Preferably the highest number that fulfills this requirement should be used. Thus in the present instance these dynamo electric machines are wound for 6 poles, each pole corresponding to 8 poles on machines 13 and 14 and 6 poles on machines 25 and 26. These dynamo electric machines tend to keep the propeller shafts 11 and 12 in synchronism as regards their own rotors, and if there is any tendency for one shaft to get out of step the stators of these dynamo electric machines would have circulating currents produced in them which would exert a torque tending to bring these shafts back to synchronism. All of the rotors on each shaft should be accurately aligned so that one pole member of machine 27 will exactly coincide with a block of 8 poles of machine 13 and a block of 6 poles of machine 12 and further so that the alternate arrangements of north and south poles in each block are the same. The same observations hold as regards the three machines mounted on shaft 12. Since the rotor members of machines 27 and 28 must always be in synchronism when they are active, it is evident that the rotor members of motors 25 and 26 must also always be in synchronism, since there are an even number of poles on machines 25 and 26 corresponding to one pole on the machines 27 and 28. While all of the motors 13, 14, 25 and 26 are operating for high speed operation it is not necessary to provide excitation for machines 27 and 28, since then the two shafts 11 and 12 are maintained in synchronism by the parallel connection of the motors. During the change-over, however, from low speed to high speed, excitation is supplied to these machines 27 and 28 so as to bring the shafts into synchronism before motors 25 and 26 are connected to the source 20. These machines 27 and 28 may be built very small for their output, since they are in service during a very short period of time. Furthermore, their output is also of a small order as they have to take care merely of the difference in torque of the two propeller shafts.

To point out more fully how the system illustrated in Fig. 2 is operated in going from standstill to full speed the following explanation is provided: The low speed turbine 21 would be run at slow speed and switched on to motors 13 and 14 by means of switch 18. These motors are at the start provided with no excitation. Excitation would now be supplied to dynamo electric machines 27 and 28 and this would bring all of the machines into correct phase relationship. Excitation could now be supplied to the motors 13 and 14 and taken off of the dynamo electric machines 27 and 28. The low speed turbine 21 could then be run up to its normal low speed value and if it were desired to operate the ship at that speed no further manipulation is required. If it is required, however, to operate the ship at high speed, high speed alternator 19 would be started and run up to the same speed as the alternator 20. The low frequency alternator 20 would then be disconnected from motors 13 and 14 and the high frequency alternator 19 would be connected thereto by proper manipulation of switches 17 and 18. During this operation, excitation is supplied to the dynamo electric machines 27 and 28. The low frequency alternator 20 would then be run at the frequency corresponding to that of motors 25 and 26 and switched on at low voltage. Now excitation for the motors 13, 14, 25 and 26 may be supplied and the turbines 21 and 22 accelerated to their normal full speed. After this is accomplished the excitation for the machines 27 and 28 may be discontinued.

While we have shown in the accompanying drawings several embodiments of our invention, we do not wish to be limited thereto, but aim to embrace in the appended claims all modifications falling fairly within the scope of our invention.

What we claim as new and desire to secure by Letters Patent of the United States, is:—

1. An electric ship propulsion system comprising a pair of propeller shafts, a pair of similar synchronous motors, each driving separate propeller shafts, a source of relatively high frequency alternating current, a source of relatively low frequency alternating current, means for connecting the high frequency source to the pair of motors, auxiliary driving motors for the shafts arranged to operate with fewer poles than the main motors, and to be connected with the low frequency source, and means whereby the auxiliary motors are kept in synchronism while the main motors are in synchronism.

2. An electric ship propulsion system comprising a pair of propeller shafts, a pair of similar synchronous motors, each mounted on separate shafts, a source of relatively high frequency alternating current, a source of relatively low frequency alternating current, means for connecting said motors in parallel to the high frequency source another pair of driving motors each having a rotor and the rotors mounted on separate shafts, said latter motors having fewer poles than the other motors and means for connecting said motors in parallel to the low frequency source, the arrangement being such that when the synchronous motors are synchronized, the rotors of the second pair of motors are likewise in synchronism, whereby there can be no appreciable circulating currents between the second pair of motors.

3. An electric ship propulsion system comprising a pair of propeller shafts, a pair of similar synchronous motors, each directly driving separate propeller shafts, a source of relatively high frequency alternating current, a source of relatively low frequency alternating current, means for connecting the synchronous motors in parallel to the high frequency source, another pair of similar synchronous motors each directly driving separate propeller shafts, means for connecting these latter motors in parallel to the low frequency source, these motors having fewer poles than the first mentioned motors in the same ratio as the frequencies of the low and high frequency source, and means for insuring synchronism of the motors with fewer poles while the other motors are in synchronism comprising a dynamo electric machine on each shaft, having an armature member and a field member of such a number of poles that there is an even number of poles on all of the motors for each of the poles on this field member, said armature members being adapted for connection in opposition to each other.

4. In an electric ship propulsion system comprising two alternators, one operated by a low speed prime mover and the other by a high speed prime mover, two propeller shafts each having a plurality of synchronous motors of differing pole numbers, the motors having a larger pole number being furnished with squirrel cage windings, and a dynamo electric machine on each shaft having an armature and a field member of such a number of poles that there is an even number of poles on all of the motors for each of the poles of this field member, the method of starting the ship which consists in running the low speed prime mover, operating the synchronous motors of larger pole numbers in parallel without field excitation from the alternator driven from the low speed prime mover, supplying excitation to the field members of the dynamo electric machines, connecting their armatures in opposition, supplying field excitation to the operating synchronous motors, gradually speeding up the alternator supplying the motors to its normal speed, running the high speed alternator at the speed of the active alternator, disconnecting the first alternator, connecting the high speed alternator to the synchronous motors with large pole numbers, gradually increasing the speed of the high speed alternator to its normal value, and connecting the low speed alternator to the motors with the fewer poles.

In witness whereof, we have hereunto set our hands this twenty-sixth day of February, 1921.

JOHN MARTIN.
FRED. H CLOUGH.

Witnesses:
N. EDWARD WALLIN,
J. A. FOSTER.